United States Patent
Schumacher et al.

(10) Patent No.: US 11,787,983 B2
(45) Date of Patent: Oct. 17, 2023

(54) METHOD OF MAKING FILM LAMINATES USING AMINE-REACTIVE ACRYLIC LAMINATION ADHESIVES

(71) Applicant: BASF SE, Ludwigshafen am Rhein (DE)

(72) Inventors: Karl-Heinz Schumacher, Ludwigshafen am Rhein (DE); Matthias Gerst, Ludwigshafen am Rhein (DE); Peter Preishuber-Pfluegl, Ludwigshafen am Rhein (DE); Kevin Payne, Wyandotte, MI (US); Timothy Klots, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 54 days.

(21) Appl. No.: 17/633,972

(22) PCT Filed: Aug. 10, 2020

(86) PCT No.: PCT/EP2020/072417
§ 371 (c)(1),
(2) Date: Feb. 9, 2022

(87) PCT Pub. No.: WO2021/032524
PCT Pub. Date: Feb. 25, 2021

(65) Prior Publication Data
US 2022/0325147 A1 Oct. 13, 2022

Related U.S. Application Data

(60) Provisional application No. 62/889,903, filed on Aug. 21, 2019.

(51) Int. Cl.
| | | |
|---|---|---|
| *C09J 133/08* | (2006.01) | |
| *B32B 7/12* | (2006.01) | |
| *B32B 27/08* | (2006.01) | |
| *B32B 27/32* | (2006.01) | |
| *B32B 27/36* | (2006.01) | |
| *B32B 37/12* | (2006.01) | |
| *B32B 37/24* | (2006.01) | |

(52) U.S. Cl.
CPC .............. *C09J 133/08* (2013.01); *B32B 7/12* (2013.01); *B32B 27/08* (2013.01); *B32B 27/32* (2013.01); *B32B 27/36* (2013.01); *B32B 37/1284* (2013.01); *B32B 37/24* (2013.01); *B32B 2037/243* (2013.01); *B32B 2250/02* (2013.01); *B32B 2250/24* (2013.01); *B32B 2255/10* (2013.01); *B32B 2255/26* (2013.01); *B32B 2307/518* (2013.01); *B32B 2307/54* (2013.01); *B32B 2307/748* (2013.01)

(58) Field of Classification Search
None
See application file for complete search history.

(56) References Cited

U.S. PATENT DOCUMENTS

| | | | |
|---|---|---|---|
| 5,223,311 A | 6/1993 | Tsutsumi et al. | |
| 2010/0136347 A1* | 6/2010 | Simons | B32B 27/32 528/80 |
| 2012/0156382 A1* | 6/2012 | Eichelmann | C09D 163/00 523/435 |
| 2017/0015883 A1* | 1/2017 | Lammerschop | C08J 7/0427 |
| 2018/0155479 A1* | 6/2018 | Licht | B32B 27/00 |
| 2019/0390094 A1* | 12/2019 | Wu | C08G 18/5084 |

FOREIGN PATENT DOCUMENTS

| | | | |
|---|---|---|---|
| CN | 1074470 A * | 7/1993 | ............ C09J 133/04 |
| EP | 2719532 A1 | 4/2014 | |
| NO | 2016/202652 A1 | 12/2016 | |
| WO | 98/23656 A1 | 6/1998 | |
| WO | 2008/019215 A1 | 2/2008 | |
| WO | 2011/000619 A1 | 1/2011 | |
| WO | 2015/150543 A1 | 10/2015 | |
| WO | 2018/140116 A1 | 8/2018 | |

OTHER PUBLICATIONS

Fuxiang—CN 1074470 A-MT—acrylic acid adhesive w-polyamie—1993 (Year: 1993).*
International Search Report and Written Opinion received for PCT Patent Application No. PCT/EP2020/072417, dated Nov. 27, 2020, 8 pages.

* cited by examiner

*Primary Examiner* — John Vincent Lawler
(74) *Attorney, Agent, or Firm* — Faegre Drinker Biddle & Reath LLP

(57) ABSTRACT

A description is given of a method of making film laminates using a lamination adhesive comprising (a) at least one acrylic polymer A with anhydride groups which are reactive with primary or secondary amine groups; and (b) at least one compound B with at least two amine groups selected from primary and secondary amine groups. The acrylic polymer A has a molecular weight of from 3000 to 50000 and the lamination adhesive is free of organic solvents, free of water and free of compounds with isocyanate groups.

16 Claims, No Drawings

METHOD OF MAKING FILM LAMINATES USING AMINE-REACTIVE ACRYLIC LAMINATION ADHESIVES

CROSS-REFERENCE TO RELATED APPLICATIONS

This application is a national stage application (under 35 U.S.C. § 371) of PCT/EP2020/072417, filed Aug. 10, 2020, which claims benefit of U.S. Application No. 62/889,903, filed Aug. 21, 2019, both of which are incorporated herein by reference in their entirety.

The invention describes a method of making film laminates using a lamination adhesive comprising an acrylic polymer A with functional groups which are reactive with primary or secondary amine groups, and a compound B with at least two amine groups selected from primary and secondary amine groups. The acrylic polymer A has a specific molecular weight and the lamination adhesive is free of organic solvents, free of water and free of compounds with isocyanate groups.

Lamination adhesive compositions are known in the form of two-component systems in which isocyanate components react with polyol components to give a polyurethane polymer of high molecular weight. These systems can be applied for example as solvent-free and anhydrous reactive neat systems. The coating compositions are applied to a first substrate by means of a suitable application system and then curing is effected. The reactive isocyanates present in conventional coating compositions constitute a toxicological risk. This relates firstly to the processing of these coating compositions, because the isocyanates generally have a certain toxicity and allergenic potential. There is secondly the risk that, in the case of flexible substrates, aromatic isocyanates that have not fully reacted will migrate through the substrate and will be hydrolyzed there by fractions of water to give potentially carcinogenic aromatic amines. What are therefore desirable are isocyanate-free two-component systems for curable lamination adhesive compositions with good curing properties at low temperatures such as 40° C. or lower or at room temperature.

WO 2016/202652 describes isocyanate-free lamination adhesives based on compounds with exo-vinylen cyclocarbonate groups. WO 2015/150543 describes isocyanate-free lamination adhesives based on compounds with polyurethane prepolymers, cyclic carbonate groups and epoxy groups.

It was an object of the invention to provide a method for film lamination using a two-component, solventless lamination adhesive free of isocyanates which can cure at low temperatures and provides sufficiently high lamination bond strength after curing. It has been found that the object can be achieved by application of the lamination adhesives as described below.

A subject of the invention is a method of making film laminates, the method comprising the steps of
(i) coating a film substrate with at least one lamination adhesive; and
(ii) laminating the coated film onto a substrate;
wherein the lamination adhesive is a two-component, solventless adhesive and comprises
(a) a first component comprising at least one acrylic polymer A with anhydride groups which are reactive with primary or secondary amine groups; and
(b) a second component comprising at least one compound B with at least two amine groups selected from primary and secondary amine groups;
wherein the acrylic polymer A has a weight average molecular weight of from 3000 to 50000, preferably from 10000 to 35000 or from 14000 to 30000;
wherein the lamination adhesive is free of organic solvents, free of water and free of compounds with isocyanate groups.

The fully reacted lamination adhesive preferably has a modulus of elasticity G' of from more than 0.1 and up to 1 MPa at 23° C.

The text below occasionally uses the designation "(meth)acryl . . . " and similar designations as an abbreviated notation for "acryl . . . or methacryl . . . ". In the designation Cx alkyl (meth)acrylate and analogous designations, x denotes the number of the carbon atoms of the alkyl group.

The glass transition temperature can be determined by Differential Scanning Calorimetry (ASTM D 3418-08, midpoint temperature). The glass transition temperature of the polymer is the glass transition temperature obtained when evaluating the second heating curve (heating rate 20° C./min).

The molecular weight is measured by Gel Permeation Chromatography (GPC, details see examples).

The modulus of elasticity G' is measured by dynamic-mechanical thermo-analysis (DMTA) at 23° C.

Two component adhesives are adhesives which comprise two components which are held separately until shortly before their use and which comprise polyfunctional constituents which react with one another upon mixing and in doing so hardening or crosslinking to a polymeric network.

The laminating adhesive is preferably not self-adhesive. Non-self-adhesive adhesives are adhesives which in contrast to pressure sensitive adhesives exhibit only very little tack, or none, at room temperature and are employed preferably with application of pressure and/or elevated temperature. The tack, measured as loop tack, is preferably less than 1.7 N/25 mm (adhesive in an applied thickness of 20 μm, applied to a polyester film 12 μm thick, measured on steel at room temperature (20° C.) with a removal velocity of 300 mm/min).

The first component of the lamination adhesive comprises at least one acrylic polymer A with anhydride groups which are reactive with primary or secondary amine groups. As amine components di- or oligomeric amines are used. The mixing ratio of the acrylic polymer A with the amine component is adjusted in such a way that the ratio of the amine groups to the anhydride groups is preferably from 0.5 to 2.0, more preferably from 0.8 to 1.2 or from 1:1 to 1.2:1.

The acrylic polymer is preferably made of
(a) from 85 to 99 wt. % of at least one alkyl(meth)acrylate monomer which, when polymerized as homopolymer has a glass transition temperature below 0° C., measured by Differential Scanning Calorimetry according to ASTM D 3418-08 as the midpoint temperature of the second heating curve at a heating rate or 20° C./min;
(b) from 1 to 15% by weight of at least one monomer with at least one anhydride group which is reactive with primary or secondary amine groups;
(c) optionally from 0 to 9% by weight of at least one monomer different from monomers (a) and (b).

The amount of monomers (a) is preferably from 85 to 99% by weight or from 90 to 99% by weight or from 92 to 98.5% by weight, based on the total amount of monomers of the acrylic polymer. Suitable monomers (a) are for example acrylic acid alkyl esters such as for example C2- to C12 alkyl acrylates, or $C_4$- to $C_{12}$-alkyl acrylates, or $C_4$- to $C_3$-alkyl acrylates. Suitable are for example ethyl acrylate, propyl acrylate, n-butyl acrylate, isobutyl acrylate, sec-butyl acrylate, n-hexyl acrylate, n-hexyl methacrylate, heptyl acrylate, octyl acrylate, lauryl acrylate and 2-ethylhexyl acrylate and mixtures thereof. Preferred are ethyl acrylate, n-butyl acrylate and 2-ethylhexyl acrylate and mixtures thereof. Especially preferred are n-butyl acrylate and 2-ethylhexyl acrylate and mixtures thereof.

The amount of monomers (b) with at least one anhydride group is preferably from 1 to 15% by weight or from 1 to 10% by weight or from 1.5 to 8% by weight, based on the total amount of monomers of the acrylic polymer. Suitable monomers (b) are monomer which have at least one functional segment
—C(=O)—O—C(=O)— and at least one ethylenically unsaturated double bond. Examples are itaconic acid anhydride and maleic acid anhydride. Preferred is maleic acid anhydride.

The amount of optional monomers (c) is preferably from 0 to 9% by weight or from 0.1 to 8% by weight, based on the total amount of monomers of the acrylic polymer. The optional monomers (c) are ethylenically unsaturated, co-polymerizable compounds. Suitable monomers (c) are C1 to C20 alkyl (meth)acrylates different from those of monomer (a) (i.e. with a glass transition temperature above 0° C. when polymerized as homopolymer), monomers with hydroxyl groups, vinylester of carboxylic acids with up to 20 carbon atoms, vinyl aromatic compounds with up to 20 carbon atoms, ethylenic unsaturated nitrils, vinyl halides, vinyl ether of alcohols with 1 to 10 carbon atoms, aliphatic hydrocarbons with 2 to 8 carbon atoms and one or two carbon-carbon double bonds, (meth)acryl amides or mixtures of these monomers.

C1 to C20 alkyl(meth)acrylates are for example methyl acrylate and methyl methacrylate. Monomers with hydroxyl groups are for example $C_1$-$C_{10}$-hydroxyalkyl (meth)acrylates (preferred hydroxypropyl acrylate and hydroxyethyl acrylate). Vinylester of carboxylic acids with 1 to 20 carbon atoms are for example vinyl acetate, vinyl laurate, vinyl stearate, vinyl propionate and Versatic acid vinylester. Vinylaromatic compounds are for example vinyl toluene, alpha- and para-methyl styrene, alpha-butyl styrene, 4-n-butyl styrene, 4-n-decyl styrene. Examples for nitrils are acrylnitril and methacrylnitril. Vinyl halides are for example ethylenically unsaturated compounds substituted with chlorine, fluorine or bromine atoms. Vinyl ethers are for example vinyl methyl ether or vinyl isobutyl ether. Preferred are vinyl ether of alcohols with 1 to 4 carbon atoms. Hydrocarbons with 4 to 8 carbon atoms and two olefinic double bonds are for example butadiene, isoprene and chloroprene.

Preferred acrylic polymers are made by radical polymerization of monomers comprising
(a) from 85 to 99 wt. % of at least one alkyl(meth)acrylate monomer selected from the group consisting of C2 to C10 alkyl acrylates, preferably ethyl acrylate, n-butyl acrylate and 2-ethylhexyl acrylate,
(b) from 1 to 15% by weight of at least one monomer with at least one anhydride group, preferably maleic acid anhydride.

The monomers of the acrylic polymer are preferably selected such that the glass transition temperature of the uncrosslinked acrylic polymer (i.e. before reaction of the anhydride groups of the acrylic polymer with the amine groups of component (b)) is in the range from −60° C. to −5° C., more particularly from −45° C. to −10° C. By purposive variation of monomer type and quantity, those skilled in the art are able according to the invention to prepare aqueous polymeric compositions whose polymers have a glass transition temperature in the desired range. Orientation is possible by means of the Fox equation. According to Fox (T. G. Fox, Bull. Am. Phys. Soc. 1956 [Ser. II] 1, page 123, and according to Ullmann's Encyclopädie der technischen Chemie, Vol. 19, page 18, 4th edition, Verlag Chemie, Weinheim, 1980), the glass transition temperature of copolymers is given to a good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees kelvin of the polymers synthesized from only one of the monomers 1, 2, ... n at a time. The $T_g$ values for the homopolymers of the majority of monomers are known and are listed for example in Ullmann's Ecyclopedia of Industrial Chemistry, Vol. 5, Vol. A21, page 169, VCH Weinheim, 1992; further sources for glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989.

The acrylic polymers A used in accordance with the invention are obtainable by radical polymerization of ethylenically unsaturated, radically polymerizable compounds (monomers).

The acrylic polymers A are of a relatively low molecular weight and are sometimes also called "solid grade oligomers" (SGO). The polydispersity index $M_w/M_n$ is preferably from 1.5 to 5, from 1.5 to 3 or from 1.5 to 2.

A preferred method of polymerization comprises continuous polymerization at high temperatures, preferably at 160 to 300° C. For example a process may be used for preparing an oligomer by continuously charging into a reactor a monomer mixture, preferably up to 5 wt. % of a polymerization initiator, and preferably from 5 wt. % to 80 wt. % of a reaction solvent; maintaining the resin mixture at a reaction temperature of preferably from 160° C. to 300° C. and removal of solvent and residual monomers from the reaction product, e.g. by distillation.

The polymerization initiator is used in amounts preferably from 0 to 5 wt. %, more preferably from 0.25 to 5 wt. % or from 2 to 5 wt. %, based on the total amount of monomers. The amount of polymerization initiator that is used is dependent upon the conditions of the reaction and may be adjusted accordingly. Preferred initiators are azo compounds, peroxide compounds or mixtures thereof. The initiators suitable for carrying out the process may thermally decompose into radicals in a first order reaction. Suitable initiators include those with half-life periods in the radical decomposition process of 1 hour at temperatures greater or equal to 90° C., and further include those with half-life periods in the radical decomposition process of 10 hours at temperatures greater or equal to 100° C. Others with 10 hour half-lives at temperatures lower than 100° C. may also be used. For example, and without limitation, the polymerization initiators may include, but are not limited to, 2,2'-azodi-(2,4-dimethylvaleronitrile); 2,2'-azobisisobutyro nitrile (AIBN); 2,2'-azobis(2-methylbutyronitrile); 1,1'-azobis (cyclohexane-1-carbonitrile); tertiary butylperbenzoate; tert-amyl peroxy 2-ethylhexyl carbonate; 1,1-bis(tert-amylperoxy) cyclohexane, tert-amylperoxy-2-ethylhexanoate, tert-amylperoxyacetate, tert-butylperoxyacetate, tert-butylperoxybenzoate (TBPB), 2,5-di-(tert-butylperoxy)-2,5-dimethylhexane, di-tert-amyl peroxide (DTAP); di-tert-butylperoxide (DTBP); lauryl peroxide; dilauryl peroxide (DLP), succinic acid peroxide; or benzoyl peroxide. In some embodiments, the polymerization initiator includes 2,2'-azodi-(2,4-dimethylvaleronitrile); 2,2'-azobisisobutyronitrile (AIBN); or 2,2'-azobis(2-methylbutyronitrile). Suitable polymerization initiator includes di-tert-amyl peroxide (DTAP); di-tert-butylperoxide (DTBP); lauryl peroxide; succinic acid peroxide; or benzoyl peroxide.

One or more solvents may be used in amounts of preferably from 20 to 80 wt. %, from 30 to 75 wt. % or from 35 to 70 wt. %, based on the total amount of monomers. The solvents are present in an amount desired, taking into account reactor conditions and monomer feed. The reaction solvent may be continuously fed into the reactor together with the monomers, or in a separate feed. The solvent may be any solvent well known in the art, including those that do not react with the vinylic monomer(s) at the temperatures of the polymerization process described herein. Suitable reaction solvents include, but are not limited to, acetone, aromatic 100, aromatic 150, aromatic-200, ethyl-3-ethoxypropionate, methyl amyl ketone, methylethylketone, methyl-isobutyl ketone, N-methylpyrrolidone (NMP), propylene glycol monomethyl ether acetate, xylene, toluene, ethyl benzene, carbitol, cyclohexanol, dipropylene glycol (mono) methyl ether, n-butanol, n-hexanol, hexyl carbitol, iso-octanol, iso-propanol, methyl cyclohexane methanol, decyl alcohol, lauryl alcohol, myristyl alcohol, cetyl alcohol, stearyl alcohol, behenyl alcohol, or isoparaffins. Preferred solvent is xylene, toluene, ethyl benzene, aromatic-100, aromatic-150, aromatic-200, acetone, methylethylketone (MEK), methyl-amylketone (MAK), methyl-isobutyl ketone (MIBK), N-methylpyrrolidinone, isopropanol or isoparaffins. The solvents are removed (e.g. by distillation) after polymerization to produce solventless adhesives.

The method of preparing the acrylic polymers A may be a continuous reactor process. According to such methods, the residence time, i.e. the time that a particular reactant is in the reactor on average, is dependent upon reactor design and reaction conditions to achieve certain properties. For example, the residence time of the reaction mixture is from 5 minutes to 60 minutes. Suitable reactors include, but are not limited to, continuous stirred tank reactors ("CSTRs"), tube reactors, loop reactors, extruder reactors, combinations of any two or more thereof, or any reactor suitable for continuous operation. CSTRs are preferred. A suitable form of a CSTR is a tank reactor provided with cooling coils and/or cooling jackets. The cooling coils and/or the cooling jackets provide for sufficient removal of the heat of polymerization not taken up by raising the temperature of the continuously charged monomer composition to maintain a preselected temperature for polymerization therein. Such a CSTR may be provided with at least one, and usually more, agitators to provide a well-mixed reaction zone. Such CSTR may be operated at varying filling levels preferably from about 20% to 100% full (liquid full reactor LFR), or more than 50% full but less than 100% full; or the reactor is 100% liquid full.

The acrylic polymers A can also be prepared by (preferably discontinuous) polymerization in organic solvents at lower temperatures using organic solvents with boiling points of for example from 50 to 150° C., preferably from 60 to 120° C., and using the customary amounts of polymerization initiators, being generally 0.01 to 10, more particularly 0.1 to 4 wt %, based on the total weight of the monomers. The polymers may be prepared at low temperatures of 20 to 150° C., preferably at temperatures in the range from 70 to 120° C. and at pressures from 0.1 to 100 bar (absolute), preferably at 0.3 to 10 bar, in the presence of 0.01 to 10 wt % of suitable peroxides or azo initiators as polymerization initiators, based on the monomers, and in the presence of 0 to 200 wt % of inert solvents, preferably 5 to 25 wt %, based on the monomers, i.e., by solution polymerization or bulk polymerization. Reaction takes place preferably under subatmospheric pressure, as for example by lowering of the pressure from atmospheric pressure (1 bar) to 500 mbar (absolute). Solvents are, for example, hydrocarbons, alcohols such as methanol, ethanol, propanol, butanol, and isobutanol, ketones such as acetone, methyl ethyl ketone, and methyl isobutyl ketone, ethyl acetate, nitriles such as acetonitrile and benzonitrile, or mixtures of the stated solvents. In one preferred embodiment of low temperature solution polymerization the solvent for the polymerization comprises one or more ketones having a boiling point of below 150° C. under atmospheric pressure (1 bar).

Examples of low temperature polymerization initiators contemplated include azo compounds, ketone peroxides, and alkyl peroxides, examples being acyl peroxides such as benzoyl peroxide, dilauroyl peroxide, didecanoyl peroxide, and isononanoyl peroxide, alkyl esters such as tert-butyl perpivalate, tert-butyl per-2-ethylhexanoate, tert-butyl permaleate, tert-butyl per-isononanoate, tert-butyl perbenzoate, tert-amyl per-2-ethylhexanoate, dialkyl peroxides such as dicumyl peroxide, tert-butyl cumyl peroxide, di-tert-butyl peroxide, and peroxodicarbonates. As initiators it is possible, furthermore, to use azo initiators such as, for example, 2,2'-azobisisobutyronitrile, 2,2'-azobis(methyl isobutyrate), or 2,2'-azobis(2,4-dimethylvaleronitrile).

For the low temperature polymerization procedure, it is also possible to admix the reaction mixture with compounds that lower the degree of polymerization, known as chain transfer agents, in amounts, for example, of 0.1 to 0.8 part by weight, based on 100 parts by weight of the monomers to be polymerized. Suitable examples include compounds having a thiol group, as for example mercaptans such as mercaptoethanol, tert-butyl mercaptan, mercaptosuccinic acid, ethylhexyl thioglycolate, 3-mercaptopropyltrimethoxysilane, or dodecyl mercaptan.

After the polymerization in the presence of organic solvents, the solvents may be removed, optionally under reduced pressure, in an operation at elevated temperatures, in the range from 100 to 150° C., for example. The polymers can then be used in the solvent-free state (solvent content preferably less than 2 wt %, based on the overall composition).

Preferably, the relative amount of anhydride monomers in the monomer mixture is higher at an early stage of the polymerization and lower at a later stage of polymerization. This ensures better anhydride monomer conversion, possibly a more homogeneous incorporation into the polymer chain and avoidance of unreacted residual anhydride monomers at the end of the polymerization.

The lamination adhesive comprises at least one compound B with at least two amine groups selected from primary and secondary amine groups. Preferably, the functional groups of compound B are selected from aliphatic primary amino groups and secondary amino groups. The lamination adhesive is a two-component adhesive which is understood to mean an adhesive comprising at least two polyfunctional binder constituents which react with one another to form bonds and in doing so form a polymeric network. Due to the anhydride groups of acrylic polymer A present therein, the acrylic polymers of the invention can react with nucleophilic amine groups to form bonds. Examples of such nucleophilic groups are particularly aliphatic primary and secondary amino groups.

Accordingly, the two-component lamination adhesive compositions comprise, as well as at least one acrylic polymer A, additionally at least one compound B having at least 2 functional groups F, for example 2, 3, 4, 5, 6, 7, 8, 9 or 10 functional groups F, which are primary or secondary amino groups, preferably selected from aliphatic primary or secondary amino groups. These compounds are also referred to hereinafter as hardeners or as amine hardeners. Preferably, the amount of hardener is selected such that the molar ratio of anhydride groups to the functional groups F in the hardener is in the range from 1:10 to 10:1, particularly in the range from 5:1 to 1:5 and especially in the range from 1:2 to 2:1.

The amine hardener may be a low molecular weight substance, which means that the molecular weight thereof is below 500 g/mol, or an oligomeric or polymeric substance having a number-average molecular weight above 500 g/mol. Preferably the amine hardener is polymeric and has 3 or more amine groups.

Suitable amine hardeners include, for example, aliphatic and cycloaliphatic polyamines, aromatic and araliphatic polyamines and polymeric amines, for example amino resins and polyamidoamines. Amine hardeners B crosslink with the acrylic polymers A having anhydride groups by reaction of the primary or secondary amino functions of the polyamines with the anhydride groups of the polymer A to form amide functions. Preferred polyamine hardeners have an average of at least two primary or secondary amino groups per molecule, for example two, three or four primary or secondary amino groups per molecule. They may also additionally comprise one or more tertiary amino groups. Suitable polyamines are, for example,

- aliphatic polyamines such as ethylenediamine, 1,2- and 1,3-propanediamine, neopentane diamine, hexamethylenediamine, octamethylene diamine, 1,10-diaminodecane, 1,12-diaminododecane, diethylenetriamine, triethylenetetramine, tetraethylenepentamine, 2,2-dimethylpropylenediamine, trimethyl hexamethylenediamine, 1-(3-aminopropyl)-3-aminopropane, 1,3-bis(3-aminopropyl)propane, 4-ethyl-4-methylamino-1-octylamine, and the like;
- cycloaliphatic diamines, such as 1,2-diaminocyclohexane, 1,2-, 1,3-, 1,4-bis(amino-methyl)cyclohexane, 1-methyl-2,4-diaminocyclohexane, N-cyclohexylpropylene-1,3-diamine, 4-(2-aminopropan-2-yl)-1-methylcyclohexane-1-amine, isophoronediamine, 4,4'-diaminodicyclohexylmethane (Dicykan), 3,3'-dimethyl-4,4'-diaminodicyclohexylmethane, 3,3',5,5'-tetramethyl-4,4'-diaminodicyclohexylmethane, 4,8-diaminotricyclo[5.2.1.0]decane, norbornanediamine, menthanediamine, menthenediamine, and the like;
- aromatic diamines, such as tolylenediamine, xylylenediamine, especially meta-xylylenediamine (MXDA), bis(4-aminophenyl)methane (MDA or methylenedianiline), bis(4-aminophenyl) sulfone (also known as DADS, DDS or dapsone), and the like;
- cyclic polyamines, such as piperazine, N-aminoethylpiperazine, and the like;
- polyetheramines, especially difunctional and trifunctional primary polyetheramines based on polypropylene glycol, polyethylene glycol, polybutylene oxide, poly(1,4-butanediol), polytetrahydrofuran (polyTHF) or polypentylene oxide, for example 4,7,10-trioxatridecane-1,3-diamine, 4,7,10-trioxatridecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (from BASF SE), 1,3-diamino-4,7,10-trioxatridecane (from BASF SE), primary polyetheramines based on polypropylene glycol having an average molar mass of 230, for example Polyetheramine D 230 (from BASF SE) or Jeffamine® D 230 (from Huntsman), difunctional, primary polyetheramines based on polypropylene glycol having an average molar mass of 400, e.g. Polyetheramine D 400 (from BASF SE) or Jeffamine® XTJ 582 (from Huntsman), difunctional, primary polyetheramines based on polypropylene glycol having an average molar mass of 2000, for example Polyetheramine D 2000 (from BASF SE), Jeffamine® D2000 or Jeffamine® XTJ 578 (each from Huntsman), difunctional, primary polyetheramines based on propylene oxide having an average molar mass of 4000, for example Polyetheramine D 4000 (from BASF SE), trifunctional, primary polyetheramines prepared by reacting propylene oxide with trimethylolpropane followed by an amination of the terminal OH groups, having an average molar mass of 403, for example Polyetheramine T 403 (from BASF SE) or Jeffamine® T 403 (from Huntsman), trifunctional, primary polyetheramine prepared by reacting propylene oxide with glycerol, followed by an amination of the terminal OH groups, having an average molar mass of 5000, for example Polyetheramine T 5000 (from BASF SE) or Jeffamine® T 5000 (from Huntsman), aliphatic polyetheramines formed from a propylene oxide-grafted polyethylene glycol and having an average molar mass of 600, for example Jeffamine® ED-600 or Jeffamine® XTJ 501 (each from Huntsman), aliphatic polyetheramines formed from a propylene oxide-grafted polyethylene glycol and having an average molar mass of 900, for example Jeffamine® ED-900 (from Huntsman), aliphatic polyetheramines formed from a propylene oxide-grafted polyethylene glycol and having an average molar mass of 2000, for example Jeffamine® ED-2003 (from Huntsman), difunctional, primary polyetheramine prepared by amination of a propylene oxide-grafted diethylene glycol, having an average molar mass of 220, for example Jeffamine® HK-511 (from Huntsman), aliphatic polyetheramines based on a copolymer of poly(tetramethylene ether glycol) and polypropylene glycol having an average molar mass of 1000, for example Jeffamine® XTJ-542 (from Huntsman), aliphatic polyetheramines based on a copolymer of poly(tetramethylene ether glycol) and polypropylene glycol having an average molar mass of 1900, for example Jeffamine® XTJ-548 (from Huntsman), aliphatic polyetheramines based on a copolymer of poly(tetramethylene ether glycol) and polypropylene glycol having an average molar mass of 1400, for example Jeffamine® XTJ-559 (from Huntsman), polyethertriamines based on a butylene oxide-grafted, at least trihydric alcohol having an average molar mass of 400, for example Jeffamine® XTJ-566 (from Huntsman), aliphatic polyetheramines prepared by amination of butylene oxide-grafted alcohols having an average molar mass of 219, for example Jeffamine® XTJ-568 (from Huntsman), polyetheramines based on pentaerythritol and propylene oxide having an average molar mass of 600, for example Jeffamine® XTJ-616 (from Huntsman), polyetheramines based on triethylene glycol having an average molar mass of 148, for example Jeffamine® EDR-148 (from Huntsman), difunctional, primary polyetheramines prepared by amination of a propylene oxide-grafted ethylene glycol, having an average molar mass of 176, for example Jeffamine® EDR-176 (from Huntsman), and also polyetheramines prepared by amination of polytetrahydrofuran (polyTHF) having an average molar mass of 250, for example PolyTHF-amine 350 (BASF SE), and mixtures of these amines;

polyamidoamines (amidopolyamines), which are obtainable by reaction of dimeric fatty acids (for example dimeric linoleic acid) with polyamines of low molecular weight, such as diethylenetriamine, 1-(3-aminopropyl)-3-aminopropane or triethylenetetramine, or other diamines, such as the aforementioned aliphatic or cycloaliphatic diamines;

adducts obtainable by reaction of amines, especially diamines, with a deficiency of epoxy resin or reactive diluent, preference being given to using those adducts in which about 5% to 20% of the epoxy groups have been reacted with amines, especially diamines;

phenalkamines as known from epoxide chemistry;

Mannich bases which are prepared, for example, by condensation of polyamines, preferably diethylenetriamine, triethylenetetramine, isophoronediamine, 2,2,4- or 2,4,4-trimethylhexamethylenediamine, 1,3- and 1,4-bis(aminomethyl)cyclohexane, with aldehydes, preferably formaldehyde, and mono- or polyhydric phenols having at least one aldehyde-reactive core site, for example the various cresols and xylenols, p-tert-butylphenol, resorcinol, 4,4'-dihydroxydiphenylmethane, 4,4'-dihydroxydiphenyl-2,2-propane, but preferably phenol;

and mixtures of the aforementioned amine hardeners, especially mixtures of difunctional amines from the group of the aliphatic, cycloaliphatic and aromatic amines with the aforementioned polyetheramines.

Preferred amine hardeners are aliphatic polyamines, especially 2,2-dimethylpropylenediamine, aromatic diamines, especially m-xylylenediamine (MXDA) and cycloaliphatic diamines, especially isophoronediamine, N-cyclohexylpropylene-1,3-diamine and 4,4'-diaminodicyclohexylmethane. Preference is also given to difunctional or trifunctional primary polyetheramines based on polypropylene glycol, for example Jeffamine® D 230 or Jeffamine® T 403. Particular preference is given to polyamines in which there is high mobility and low steric hindrance around the amino group, for example 4,9-dioxadodecane-1,12-diamine, 4,7,10-trioxatridecane-1,13-diamine, PolyTHF Amine 350 (BASF SE).

Preference is also given to mixtures of the amines specified as preferred, for example mixtures comprising a diamine and a polyethyleneimine.

Most preferred compounds B are selected from the group consisting of organic diamines, polyether amines and polyethylene imines.

In the lamination adhesive of the invention, the total amount of amine hardeners B is preferably 0.1% by weight to 50% by weight, or 0.5% to 40% by weight and especially 1% to 30% by weight, based on the total amount of acrylic polymer A plus amine hardener B.

The molar ratio of the amount of anhydride groups of polymer A which are reactive with primary or secondary amine groups to the amount of primary or secondary amine groups of compound B is from 0.5 to 2.0, preferably from 0.8 to 1.2 or about equimolar.

The two-component lamination adhesive is free of isocyanates, meaning that it does not comprise any isocyanate compounds as hardeners.

The two-component binder is solvent-free. "Solvent-free" means that less than 5% by weight, more preferably less than 2% by weight or zero organic solvent or water is present.

The lamination adhesive composition can be hardened thermally by heating the mixture of components A and B to a mixing temperature or above the mixing temperature. The hardening can also be effected at lower temperatures. Typically, the adhesive compositions of the invention are hardened at temperatures in the range from 10 to 100° C., preferably in the range from 20 to 80° C. Hardening is particularly advantageously effected at temperatures of 25 to 50° C. The temperature which is suitable depends on the respective hardeners and the desired hardening rate, and can be determined in the individual case by the person skilled in the art, for example by simple preliminary tests. In the lower temperature range (20 to about 30° C.), which corresponds to the usually prevailing ambient temperature, it is sufficient to mix polymer of the invention and hardener without additional heating. Alternatively, the hardening can be microwave-induced.

The lamination adhesive may comprise additives customary therefor. The choice of suitable conventional additives for the composition of the invention depends on the particular end use of the two-component lamination adhesive and can be determined in the individual case by the person skilled in the art.

Suitable additives comprise, for example, antioxidants, UV absorbers/light stabilizers, metal deactivators, antistats, reinforcers, fillers, antifogging agents, blowing agents, biocides, plasticizers, lubricants, emulsifiers, colorants, pigments, rheology agents, impact tougheners, adhesion regulators, optical brighteners, flame retardants, antidripping agents, nucleating agents, wetting agents, thickeners, protective colloids, defoamers, tackifiers, reactive diluents, and mixtures thereof.

Any light stabilizers/UV absorbers, antioxidants and metal deactivators used preferably have a high migration stability and thermal stability. They are selected, for example, from groups a) to t). The compounds of groups a) to g) and i) are light stabilizers/UV absorbers, while compounds j) to t) act as stabilizers.

a) 4,4-diarylbutadienes,
b) cinnamic esters,
c) benzotriazoles,
d) hydroxy benzophenones,
e) diphenyl cyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thio synergists,
r) peroxide-destroying compounds,
s) polyamide stabilizers and
t) basic costabilizers.

The lamination adhesive according to the invention preferably has a viscosity of less than 500 Pa s at 40° C. (measurement method ISO 2721-10 at 40° C. and shear rate of 100 l/s). The rheology of the lamination adhesive according to the invention preferably is such that it is coatable on substrate films with roll coaters at temperatures of 40° C. or lower.

The lamination adhesive according to the invention preferably has an adhesive bond strength such that the peel strength of a film-to-film laminate of two polyethylene terephthalate films is at least 0.4 N/15 mm at 23° C. more preferably at least 0.5 N/15 mm at 23° C. and after 24 hours storage at 23° C.

The open time is the time after mixing of the two components A and B in which the lamination adhesive can be further processed and coated on substrates. The open time preferably is at least 10 minutes.

A subject of the invention is a method of making film laminates, the method comprising the steps of
(i) coating a film substrate with at least one laminating adhesive as described herein; and
(ii) laminating the coated film onto a substrate.

The coating temperature preferably is 40° C. or less. The adhesive is preferably not crosslinked by UV radiation.

A subject of the invention is also the use of a lamination adhesive as described herein for making film laminates.

A subject of the invention is also a film laminate wherein a film is bonded to a substrate using a lamination adhesive as described herein or wherein the film laminate is a product of the method as described herein. The film laminate preferably is a film-to-film laminate having a first polymeric film and at least one second polymeric film or a metal film.

The material of the first film is preferably selected from the group consisting of polyethylene, oriented polypropylene, undrawn polypropylene, polyamide, polyethylene terephthalate, polyacetate, cellophane. The material of the second film is preferably selected from the group consisting of polyethylene, oriented polypropylene, undrawn polypropylene, polyamide, polyethylene terephthalate, polyacetate, cellophane, metalized films and metal foils.

The first and the second films of the film-to-film laminate are bonded to one another with the lamination adhesive so firmly that the peel strength, measured 24 h after laminate production and at 23° C. and 50% relative humidity, preferably is 0.4 N/15 mm, more preferably 0.5 N/15 mm or more.

The lamination adhesives in accordance with the invention can be used for the bonding of substrates of large surface area, more particularly for the production of composite films.

In the method for producing composite films, at least two films are bonded to one another using the lamination adhesive. In this method, the lamination adhesive is applied to the large-surface-area substrates to be bonded, preferably with a layer thickness of 0.1 to 20 g/m$^2$, more preferably 1 to 7 g/m$^2$ or 2 to 4 g/m$^2$, by means, for example, of knife coating, spreading, etc. Customary coating techniques may be employed, examples being roller coating, reverse roller coating, gravure roller coating, reverse gravure roller coating or flexo coating. The coated substrate may then be laminated with a second substrate, the temperature can for example be 20 to 200° C., preferably 20 to 100° C., and the pressure can, for example, be 100 to 3000 kN/m$^2$ preferably 300 to 2000 kN/m$^2$.

In film-to-film lamination (also called composite film lamination), at least two films are bonded to one another with the laminating adhesive. At least one of the films may be metalized or printed on the side coated with the adhesive. Examples of suitable substrates include polymer films, more particularly films of polyethylene (PE; high density HDPE or low density LDPE), oriented polypropylene (OPP), undrawn polypropylene (CPP), polyamide (PA), polyethylene terephthalate (PET), polyacetate, cellophane, polymer films coated (vapor coated) with metal, e.g., aluminum (metalized films for short), or metal foils, composed of aluminum, for example. The stated foils and films may be bonded to one another of identical or similar types or to a film or foil of another type, for example a polymer film may be bonded to a metal foil, or a polymer film may be bonded to a polymer film of a different polymer type. The stated foils and films may also, for example, have been printed with printing inks.

The thickness of the first and second substrate films may amount for example to from 5 to 500 μm, preferably from 5 to 100 μm or from 5 to 40 μm.

Preferably, the material of the first film is selected from the group consisting of polyethylene, oriented polypropylene, undrawn polypropylene, polyamide, polyethylene terephthalate, polyacetate, cellophane. Preferably, the material of the second film is selected from the group consisting of polyethylene, oriented polypropylene, undrawn polypropylene, polyamide, polyethylene terephthalate, polyacetate, cellophane, metalized films and metal foils.

Preferably, the first polymeric film is a polyolefin (such as for example polyethylene, oriented polypropylene, undrawn polypropylene) and the second polymeric film is selected from poly-olefins (such as for example polyethylene, oriented polypropylene, undrawn polypropylene) and polyesters (such as for example polyethylene terephthalate).

It is particularly preferred that the first and second polymeric film are polypropylene or that the first polymeric film is polyethylene and the second polymeric film is polyethylene terephthalate.

Surface treatment of the foil or film substrates ahead of coating with a lamination adhesive of the invention is not absolutely necessary. However, better results can be obtained if the surfaces of the film or foil substrates are modified prior to coating. In this case it is possible to employ customary surface treatments, such as corona treatment, in order to boost the adhesion. The corona treatment or other surface treatments are carried out to the extent required for sufficient wettability with the coating composition. Customarily, corona treatment of approximately 10 watts per square meter per minute is sufficient for this purpose. Alternatively or additionally it is also possible, optionally, to use primers or tie coats between foil or film substrate and adhesive coating. Furthermore, other, additional functional layers may be present on the composite films, examples being barrier layers, print layers, color layers or varnish layers, or protective layers. These functional layers may be located externally, i.e., on the side of the foil or film substrate facing away from the adhesive-coated side, or internally, between foil or film substrate and adhesive layer.

The solventless, isocyanate-free two-component lamination adhesive of the invention is capable of building up sufficiently high binding forces in laminates even at low or moderate temperatures within a short time.

EXAMPLES

Abbreviations

BA n-butyl acrylate
EA ethyl acrylate
MAH maleic acid anhydride
EHA 2-ethylhexyl acrylate
MMA methyl methacrylate
STY styrene
GMA glycidyl methacrylate
pphm parts per hundred monomers (parts by weight per 100 parts by weight of monomers)
PET polyethylene terephthalate Measurement of Polymer Molecular Weight by GPC:

To measure molecular weight of the example polymers described below, the polymeric resin was first dissolved in a solution of tetrahydrofuran (THF) solvent then injected into a Gel Permeation Chromatogram (Waters 2695 instrument coupled with Waters 2410 Refractive Index Detector). One pair of PLGEL MIXED B columns with one guard column was used and Millennium software was used to determine the number average molecular weight (Mn), weight average molecular weight (Mw) and z average molecular weight (Mz) of the polymer.

Measurement of Modulus of Elasticity G':

The modulus of elasticity G' was measured on polymer films with a thickness of approximately 0.8 to 1.0 mm. The measurements are made by means of dynamic-mechanical thermo-analysis (DMTA). Measuring instrument: deformation-controlled modular rheometer system Ares; Parallel-Plate geometry with 8 mm diameter. Dynamic shear modulus, measurement frequency 1 Hz, heating rate 2° C./min, measuring temperature −20° C. to +200° C.

Method of Polymerization:

Examples 4 to 6

High temperature polymerization (190° C.) that is run in a continuously stirred tank reactor with acetone as solvent and monomer mixtures as described in table 1. The solvent is removed by distillation after polymerization.

Polymerization initiator: di-tert-butyl peroxide

Examples 1 to 3

The reaction temperature was 80° C. in methyl ethyl ketone solvent.

Polymerization initiator: tert-butyl peroxypivalate.

The solvent is removed by distillation after polymerization.

TABLE 1

Acrylic polymers

| Example | Monomers Parts by weight | Tg [° C.]** | Viscosity at 23° C. [Pa s] | Mw |
|---|---|---|---|---|
| Example 1 | 65 BA, 30 EA, 5 MAH | −30° C. | 140 Pa s | 25000 |
| Example 2 | 97.5 EHA, 2.5 MAH | −59° C. | 110 Pa s | 30000 |
| Example 3 | 95 EHA, 5 MAH | −57° C. | 90 Pa s | 16900 |
| Example 4 | 95 BA, 5 MAH | −40° C. | 100 Pa s | 14218 |
| Example 5*) | 83 BA, 17GMA | −25° C. | 120 Pa s | 15380 |
| Example 6 | 77 BA, 12 MMA, 11 MAH | −27.9° C. | | 4411 |

*)comparative
**calculated by FOX-equation

Two-Component Laminations Adhesives:

Two-component lamination adhesives were formed from the acrylic polymers of table 1 with amines according to table 2.

Preparation of Film-to-Film Laminates:

Acrylic polymers A were mixed with equimolar amounts of amines, based on amounts of anhydride groups.

The mixtures are knife-coated in a dry film thickness of 3 µm onto a first PET-film with thickness of 36 µm. The coated films are laminated to a second PET-film with thickness of 36 µm under a pressure of 6.5 bar and at 23° C. in a roller press at 5 m/min. The composite films are subsequently stored for 1 day at room temperature under standard conditions (23° C.; 50% relative humidity).

Measurement of Peel Strength:

Following storage of the laminate for 24 h at room temperature the laminate is cut into strips 15 millimeters wide. The laminate strip is pulled apart on a Zwick tensile testing machine and the force required to achieve this is recorded. The test takes place on a tensile testing machine at an angle of 90 degrees (T-test) and a removal velocity of 100 mm/min. The test strip is opened up on one side, with one of the resultant ends being clamped into the upper jaw and the other into the lower jaw of the tensile testing machine, and the test is commenced. The result reported is the average maximum of the force from 3 individual measurements, in N/15 mm.

The results are shown in table 2.

TABLE 2

Results of the peel test measurements

| | Acrylic polymer | Amine | Peel strength after 24 h [N/15 mm] |
|---|---|---|---|
| Example 7 | Example 1 BA/EA/MAH | 4,7,10-trioxatridecane-1,13-diamine | 0.5 |
| Example 8 | Example 1 BA/EA/MAH | 95 pts by weight 4,7,10-trioxatridecane-1,13-diamine 5 pts by weight Lupasol ® FG[(1)] | 1.0 |
| Example 9 | Example 2 EHA/MAH | Polyetheramine D 2000[(2)] | 0.8 |
| Example 10 | Example 3 EHA/MAH | Polyetheramine D 230[(3)] | 0.4 |
| Example 11 | Example 4 BA/MAH | Polyetheramine D 230[(3)] | 0.7 |
| Example 12*) | Example 5*) BA/GMA | 4,7,10-trioxatridecane-1,13-diamine | 0.1 |
| Example 13 | Example 6 BA/MMA/MAH | Polyetheramine D 230[(3)] | 5.1[(4)] |

*)comparative
[(1)]polyethyleneimine (PEI), average molecular weight 800, viscosity 800-5000 mPa s at 20° C.
[(2)]difunctional primary amine with polyoxypropylene backbone, average molecular weight about 2000.
[(3)]difunctional primary amine with polyoxypropylene backbone, average molecular weight about 230.
[(4)]lamination between 19 µm PET film and 30 µm BOPP film

The invention claimed is:

1. A method of making film laminates, the method comprising the steps of
 (i) coating a film substrate with at least one lamination adhesive; and
 (ii) laminating the coated film onto a substrate;
 wherein the lamination adhesive is a two-component, solventless adhesive and comprises
 (a) a first component comprising at least one acrylic polymer A with anhydride groups which are reactive with primary or secondary amine groups; and
 (b) a second component comprising at least one compound B with at least two amine groups selected from primary and secondary amine groups;
 wherein the acrylic polymer A has a weight average molecular weight of from 3000 to 50000;
 wherein the lamination adhesive is free of organic solvents, free of water and free of compounds with isocyanate groups.

2. Method according claim 1, wherein compound B is selected from the group consisting of organic diamines, polyether amines and polyethylene imines.

3. Method according to claim 1, wherein the acrylic polymer is made by continuous radical polymerization at a temperatures from 160 to 300° C.

4. Method according to claim 1, wherein the acrylic polymer is made of
(a) from 85 to 99 wt. % of at least one alkyl(meth)acrylate monomer which, when polymerized as homopolymer has a glass transition temperature below 0° C., measured by Differential Scanning calorimetry according to ASTM D 3418-08 as the midpoint temperature of the second heating curve at a heating rate or 20° C./min;
(b) from 1 to 15% by weight of at least one monomer with at least one anhydride group which is reactive with primary or secondary amine groups;
(c) optionally from 0 to 9% by weight of at least one monomer different from monomers (a) and (b);
wherein the fully reacted lamination adhesive has a modulus of elasticity G' of from more than 0.1 and up to 1 MPa at 23° C., measured by dynamic-mechanical thermo-analysis.

5. Method according to claim 4, wherein the acrylic polymer is made by radical polymerization of monomers comprising
(a) from 85 to 99 wt. % of at least one alkyl(meth)acrylate monomer selected from the group consisting of C2 to C10 alkyl acrylates,
(b) from 1 to 15% by weight of at least one monomer with at least one anhydride group.

6. Method according to claim 1, wherein the uncrosslinked acrylic polymer has a glass transition temperature of from −60° C. to −5° C., measured by Differential Scanning calorimetry according to ASTM D 3418-08 as the midpoint temperature of the second heating curve at a heating rate or 20° C./min.

7. Method according to claim 1, wherein the molar ratio of the anhydride groups of polymer A which are reactive with primary or secondary amine groups to the primary or secondary amine groups of compound B is from 0.5 to 2.0.

8. Method according to claim 1, wherein the polymer A is made by a polymerization process wherein the relative amount of anhydride monomers in the monomer mixture is higher at an early stage of the polymerization and lower at a later stage of polymerization.

9. Method according to claim 1, wherein the viscosity of the adhesive is less than 500 Pa s; measurement method ISO 2721-10 at 40° C. and shear rate of 100 1/s; and/or wherein the adhesive is coatable on substrate films with roll coaters at temperatures of 40° C. or lower.

10. Method according to claim 1, wherein the peel strength of a film-to-film laminate of two polyethylene terephthalate films is at least 0.4 N/15 mm at 23° C. and after 24 hours storage at 23° C.

11. Method according to claim 1 wherein the coating temperature is 40° C. or less and wherein the adhesive is not crosslinked by UV radiation.

12. A method comprising providing a lamination adhesive and making film laminates, wherein the lamination adhesive is a two-component, solventless adhesive and comprises
(a) a first component comprising at least one acrylic polymer A with anhydride groups which are reactive with primary or secondary amine groups; and
(b) a second component comprising at least one compound B with at least two amine groups selected from primary and secondary amine groups;
wherein the acrylic polymer A has a weight average molecular weight of from 3000 to 50000;
wherein the lamination adhesive is free of organic solvents, free of water and free of compounds with isocyanate groups.

13. A film laminate wherein a film is bonded to a substrate wherein the film laminate is a product of the method according to claim 1.

14. The film laminate according to claim 13 wherein the laminate is a film-to-film laminate having a first polymeric film and at least one of a second polymeric film or a metal film.

15. The film laminate according to claim 14, wherein the material of the first film is selected from the group consisting of polyethylene, oriented polypropylene, undrawn polypropylene, polyamide, polyethylene terephthalate, polyacetate, cellophane; and wherein the material of the second film is selected from the group consisting of polyethylene, oriented polypropylene, undrawn polypropylene, polyamide, polyethylene terephthalate, polyacetate, cellophane, metalized films and metal foils.

16. The film laminate according to claim 14, wherein the first and the second films are bonded to one another with the lamination adhesive so firmly that the peel strength, measured 24 h after laminate production and at 23° C. and 50% relative humidity, is 0.4 N/15 mm or more.

* * * * *